United States Patent [19]

Oshita et al.

[11] Patent Number: 5,065,324

[45] Date of Patent: Nov. 12, 1991

[54] METHOD OF DETECTING ABSOLUTE STEERING ANGLE OF STEERING ANGLE SENSOR FOR VEHICLE

[75] Inventors: Saiichiro Oshita; Toyohiko Mouri; Tsutomu Takahashi, all of Tokyo, Japan

[73] Assignee: Fuji Jukogyo Kabushiki Kaisha, Tokyo, Japan

[21] Appl. No.: 494,541

[22] Filed: Mar. 16, 1990

[30] Foreign Application Priority Data

Mar. 22, 1989 [JP] Japan .................................. 1-70000

[51] Int. Cl.$^5$ .............................................. B62D 15/00
[52] U.S. Cl. .............................. 364/424.05; 33/1 PT; 180/79.1; 180/142
[58] Field of Search ............ 364/424.05, 559, 571.01, 364/571.04; 180/140-143, 79.1; 33/1 PT

[56] References Cited

U.S. PATENT DOCUMENTS

| | | | |
|---|---|---|---|
| 4,625,411 | 12/1986 | Kashiwagi et al. | 33/1 PT |
| 4,720,791 | 1/1988 | Daido | 364/424.05 |
| 4,794,536 | 12/1988 | Eto et al. | 364/424.05 |
| 4,803,629 | 2/1989 | Noto et al. | 364/424.05 |
| 4,979,114 | 12/1990 | Oshita et al. | 364/424.05 |
| 4,999,776 | 3/1991 | Soltis et al. | 364/424.05 |

*Primary Examiner*—Salvatore Cangialosi
*Attorney, Agent, or Firm*—Beveridge, DeGrandi & Weilacher

[57] ABSTRACT

A method for detecting an absolute steering angle of a steering angle sensor such as encoder for a vehicle wherein the steering angle sensor generates an output signal indicating a relative rotation angle of a steering shaft of the vehicle and at least one reference signal representing a reference position for every one rotation of the steering shaft. The method comprises the steps of setting a deviation $\Delta\theta$ between the reference position and an actual straight-ahead driving state position responsive to the output signal and the reference signal, storing the deviation $\Delta\theta$ in a memory of a computer which holds the deviation $\Delta\theta$ while the computer is disconnected from a battery, determining a steering angle with the reference position responsive to the output signal and the reference signal, and correcting by the deviation $\Delta\theta$ the steering angle to obtain the absolute steering angle.

11 Claims, 4 Drawing Sheets

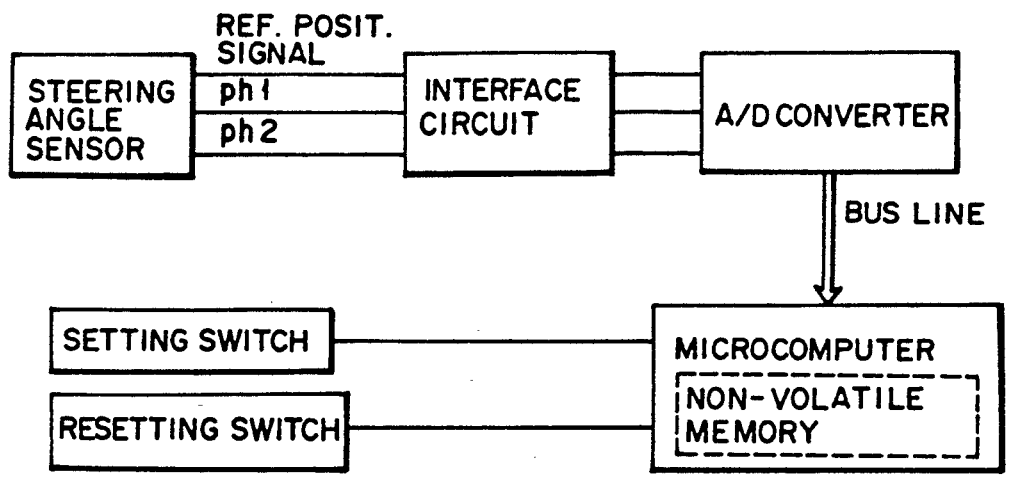
FIG. 7
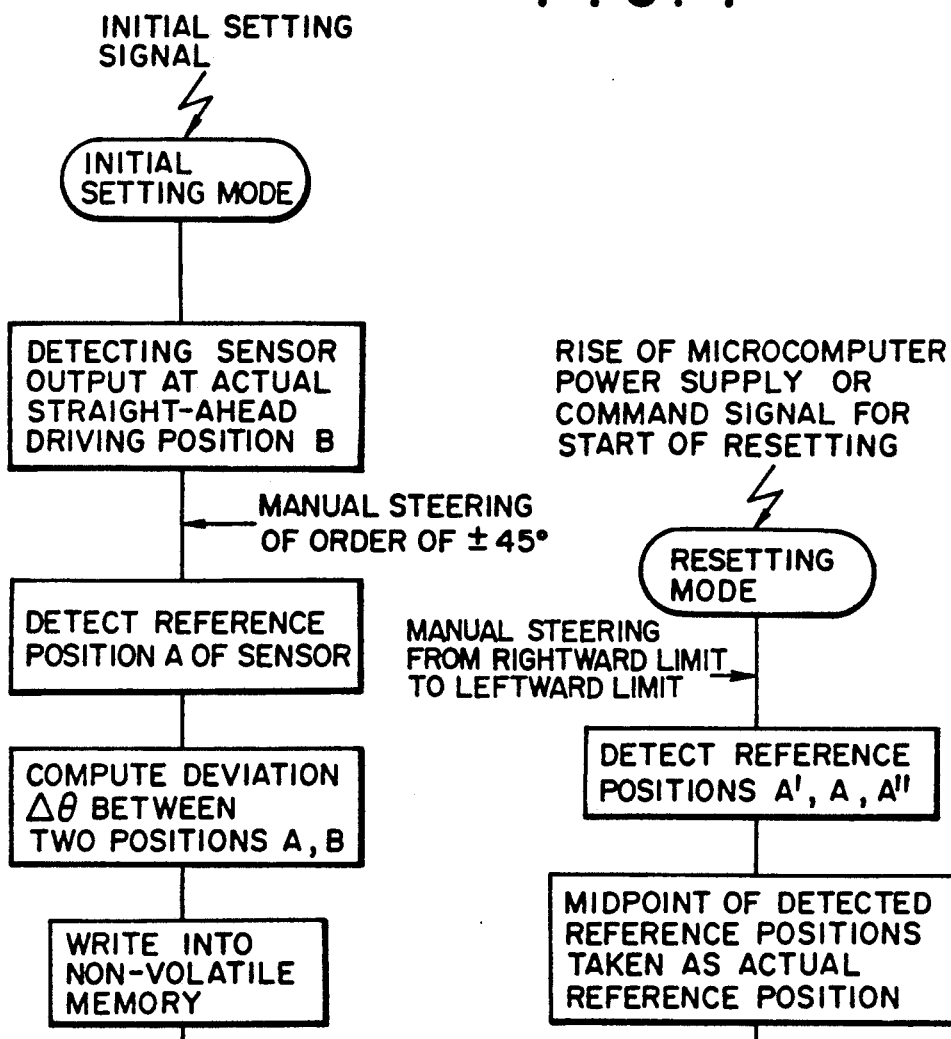
FIG. 8
FIG. 9

METHOD OF DETECTING ABSOLUTE STEERING ANGLE OF STEERING ANGLE SENSOR FOR VEHICLE

BACKGROUND OF THE INVENTION

The present invention relates generally to a steering system of a vehicle and more particularly to a method of detecting an absolute steering angle of a steering angle sensor of the vehicle.

The steering angle is decided in accordance with the angle through which a steering wheel (i.e., the steering shaft) is turned in steering action. In a vehicle of this character, it is necessary to provide a steering shaft angle (hereinafter referred to as steering angle) sensor for detecting a rotational angle of the steering shaft. An optical rotary encoder (for example, as disclosed in Japanese Utility Model Laid-Open Publn. No. 51214/1987) has been used as the steering angle sensor.

In the optical rotary encoder, a slitted disk is fixed coaxially to the steering shaft. The slitted disk is provided with a plurality of slits extending radially outward and angularly spaced at a pitch which divides the disk circumference into equal intervals. A photointerrupter with a light emitting element and a photosensitive detector or a photodetector are mounted on a fixed structure such as a steering column on opposite sides of the slitted disk so that a slitted part of the disk is interposed therebetween. Thus, light can be transmitted through the slits from the light emitting element to be received and detected by the photodetector. The light thus transmitted through the slits are detected as pulses by the photodetector when the steering shaft and the slitted disk rotates. As a result, the rotational angle of the steering shaft is detected from the number of the pulses.

The rotary encoder described above generally detects a relative displacement of a steering angle. It cannot however detect an absolute steering angle from an angle of a straight-ahead steering state as a reference some degrees to a certain right or left angle.

Detection of the absolute steering angle is possible by initially setting a straight-ahead steering position of the steering shaft counting the number of pulses of the above mentioned rotary encoder from the straight-head steering position. However, once an electric power supply is cut off, as for example a storage battery is disconnected, a stored memory of the absolute steering angle at that instant is erased. Then, the detection of the absolute steering angle thereafter becomes very difficult.

It is a principal object of the present invention to overcome impossibilities of the detection of the absolute steering angle after the stored memory is erased.

SUMMARY OF THE INVENTION

According to the present invention there is provided a method for detecting an absolute steering angle of a steering angle sensor for a vehicle wherein the steering angle sensor generates an output signal indicating a relative rotation angle of a steering shaft of the vehicle and at least one reference signal representing a reference position for every one rotation of the steering shaft. The method comprises the steps of setting a deviation between the reference position and an actual straight-ahead driving state position responsive to the output signal and the reference signal, storing the deviation in a memory of a computer which holds the deviation while the computer is disconnected from a battery, determining a steering angle with the reference position responsive to the output signal and the reference signal, and correcting by the deviation the steering angle to obtain the absolute steering angle.

As mentioned hereinbefore, there may be instances of temporary cut-off of the power supply of the microcomputer. Such instances of power failure can be caused by the disconnection of a battery terminal, for example. Consequently, stored memory of the absolute steering angle at the time is lost. According to the present invention, however, even in this case the stored value of the deviation remains. Then the true reference position is merely reset from the plurality of detected reference signals. By this simple procedure, accurate detection of the absolute steering angle thereafter can be carried out.

The other objects and features of the present invention will become understood from the following description with reference to the accompanying drawings.

BRIEF DESCRIPTION OF THE DRAWINGS

FIG. 7 is a block diagram indicating a system of finely detecting the steering angle;

FIG. 8 is an operational flow chart indicating functional steps of a procedure for initially setting an actual reference position; and FIG. 9 is a similar operational flow chart indicating functional steps of a procedure for resetting an actual reference position according to the invention.

DESCRIPTION OF THE PREFERRED EMBODIMENTS

A preferred embodiment of the present invention will become understood from the following detailed description referring to the accompanying drawings.

Figure 1:
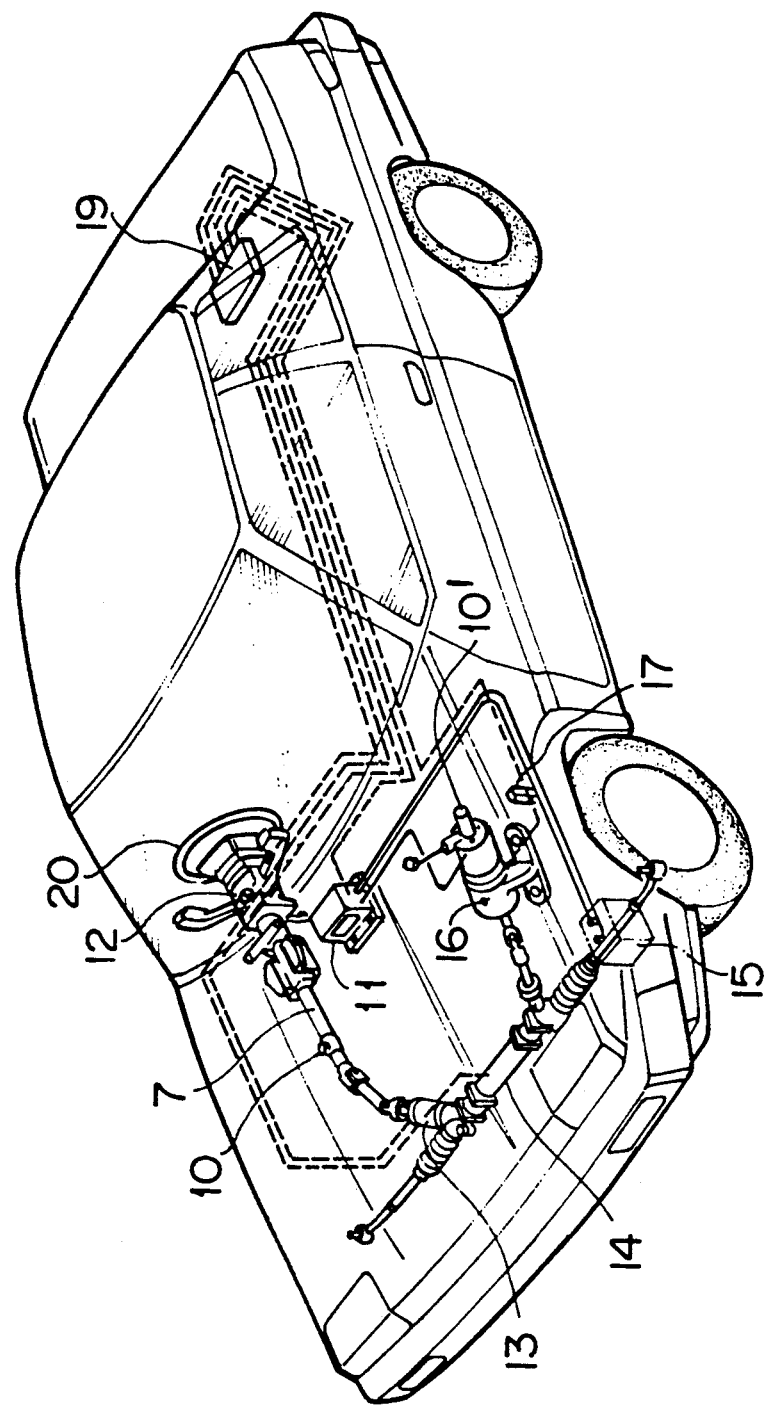
FIG. 1 is a perspective view of an automotive vehicle with a steering system according to the present invention.

The method of detecting absolute steering angles of the present invention can be applied to various kinds of vehicles. One example of such a vehicle is illustrated in FIG. 1. FIG. 1 further indicates the relationship between a steering shaft angle sensor 10 and other components of a steering system of the vehicle.

The essential components of the other components are a steering wheel 20, a steering column 7, a vehicle speed sensor warning lamp 12 (within the dashboard), a power steering control unit 11, a steering torque sensor 13, a steering gear box 14, a storage battery 15, a motor 16, a motor relay 17, and a signal control unit 19 (switch for setting). These components are known and therefore will not be described herein.

The present invention will be described with respect to one example thereof in which the steering shaft angle sensor 10 is mounted on a steering column 7.

Figure 2:
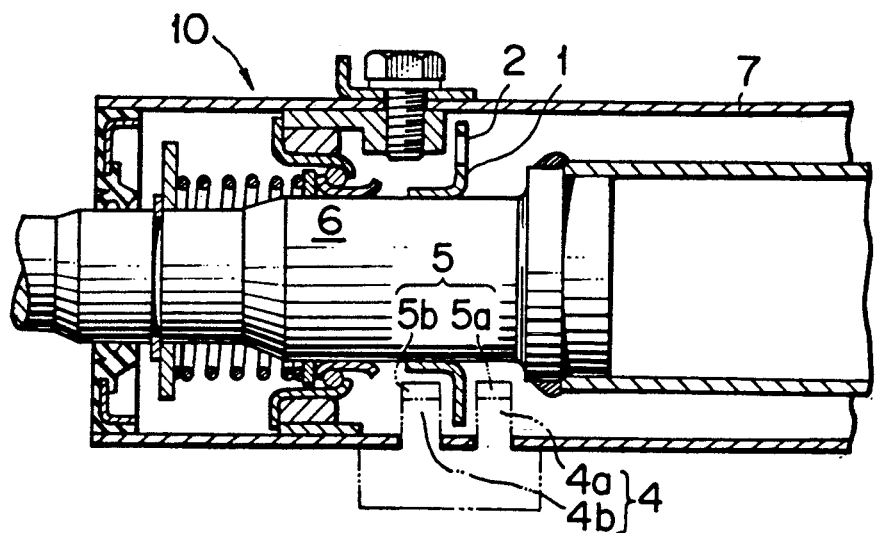
FIGS. 2 and 3 are respectively a side view and an end view showing a steering angle sensor of the present invention.
Figure 3:
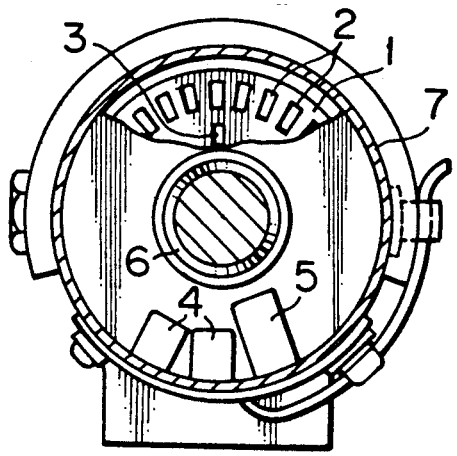
Figure 4:
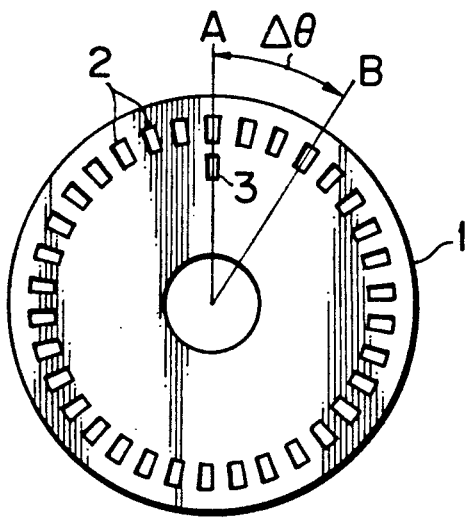
FIG. 4 is an end view of a slitted disk of the steering angle sensor used in the present invention.

A steering angle sensor 10 such as a rotary encoder suitable for use in the practice of the present invention is illustrated in FIGS. 2, 3, and 4. In the sensor 10, a slitted disk 1 as shown in FIG. 4 is fixedly and coaxially mounted on the steering shaft 6. The disk 1 is provided with a specific number of slits 2 formed on a periphery of the disk with equal intervals. Two photointerrupters 4 respectively with light-emitting and photodetecting elements 4a and 4b are mounted on the steering column 7. Light from each light-emitting element 4a passes through the slits 2 to the corresponding photodetecting element 4b. The photodetecting element 4b generates pulses corresponding to the slits 2. In this manner, a rotational angle of the steering shaft 6 is detected by counting the resulting pulses. At the same time, the respective phases of two photointerrupters 4 are relatively offset. Thus, two phases are created. Consequently, two pulse trains of two mutually offset phases are generated. From the two phase-offset pulse trains, the rotational direction of the steering shaft 6 can be detected. The present invention will now be described in connection with the two-phase pulse output type of the known rotary encoder of incremental type.

Further in the sensor 10 a neutral position mark 3 is placed on the disk 1. On a part of the fixed side such as the steering column 7, a photointerrupter 5 with light-emitting and photodetecting elements 5a and 5b is provided for detecting the neutral position mark 3. An angular position A at which the photointerrupter 5 detects the neutral position mark 3 is taken as a reference. Therefore, the number of pulses counted from the reference position A represents a steering angle of the steering shaft 6 as some degrees to the right or to the left from the reference position A.

However, a problem arises in the actual installation of a rotary encoder 10 of the above described organization on parts such as the steering shaft 6 and the steering column 7. That is, it is extremely difficult to install the encoder 10 with high precision in a manner such that the reference angular position A coincides exactly with the straight-ahead driving position of the front wheels of the vehicle. Some error inevitably occurs in most cases.

Furthermore, even if the exact coincidence is accurately attained in the installation of the rotary encoder 10, the possibility of its being lost later must be considered. That is, in an adjustment step of a tie rod after the installation of the encoder 10 in the process of assembling the vehicle. During this adjustment, an actual position B of the straight-ahead driving may deviate by $\Delta\theta$ relative to the reference position A. This problem is solved in accordance with the present invention in the following manner.

After completion of the assembly of the vehicles an operator turns the steering wheel 20. Then, when the steering wheel 20 is in the actual straight-ahead driving position B the operator turns on a setting switch which has been previously connected to a microcomputer in the control unit 11. The microcomputer sets the actual straight-ahead position responsive to a signal from the setting switch. After that, the operator alternatively turns the steering wheel 20 to the right and the left for an angle such as ±45°. The microcomputer detects the reference position A during the turning of the steering wheel 20. Further the microcomputer calculates the deviation $\Delta\theta$ between the actual straight-ahead position B and the reference position A (initial setting) responsive to a signal from the setting switch. The deviation $\Delta\theta$ has a + or − sign depending on the direction of deviation from the reference position A. The value of the deviation $\Delta\theta$ is then stored in a memory device which will not lose stored memory content therein even when the main power supply is cut off by action such as disconnection of a terminal of the storage battery 15. Examples of such a memory device is a non-volatile memory and a memory with a backup power supply. Then, the microcomputer corrects by the value of $\Delta\theta$ the steering angle corresponding to the pulse numbers from the reference position A. In this manner, accurate absolute steering angles can be detected.

The reference position A and the value of the deviation $\Delta\theta$ for detection of the absolute steering angle are initially set in the above described manner. Thereafter, as the pulses from the rotary encoder 10 are input into the microcomputer, the pulses are counted by means of a counter. The number of pulses thus counted is then corrected by $\Delta\theta$ to determine the absolute steering angle. Then the operation of storing the result in the memory, counting the succeeding pulses of the rotary encoder 10 and adding the resulting pulse count to the value thus stored is carried out continuously. By this operation, the absolute steering angle can be continuously detected as long as the power supply of the microcomputer is not cut off.

Subsequently, in the servicing work of the vehicle, for example, the power supply (main power supply) of the microcomputer may be once cut off by disconnecting the storage battery terminal. As a consequence, the stored memory of the absolute steering angle of the microcomputer would be erased. Thus, detection of the absolute steering angle would become impossible. According to the present invention, however, the value of the deviation $\Delta\theta$ of the actual straight-ahead position B relative to the reference position A is stored in the non-volatile memory or the memory with the backup power supply as described hereinbefore. The storage of the deviation $\Delta\theta$ is not erased even if the power supply of the microcomputer is once cut off. For this reason, in the case of loss of the stored memory of the absolute steering angle as mentioned above, the detection of the absolute steering angle becomes possible again merely by resetting the reference position A after resumption of the power supply.

Figure 5:
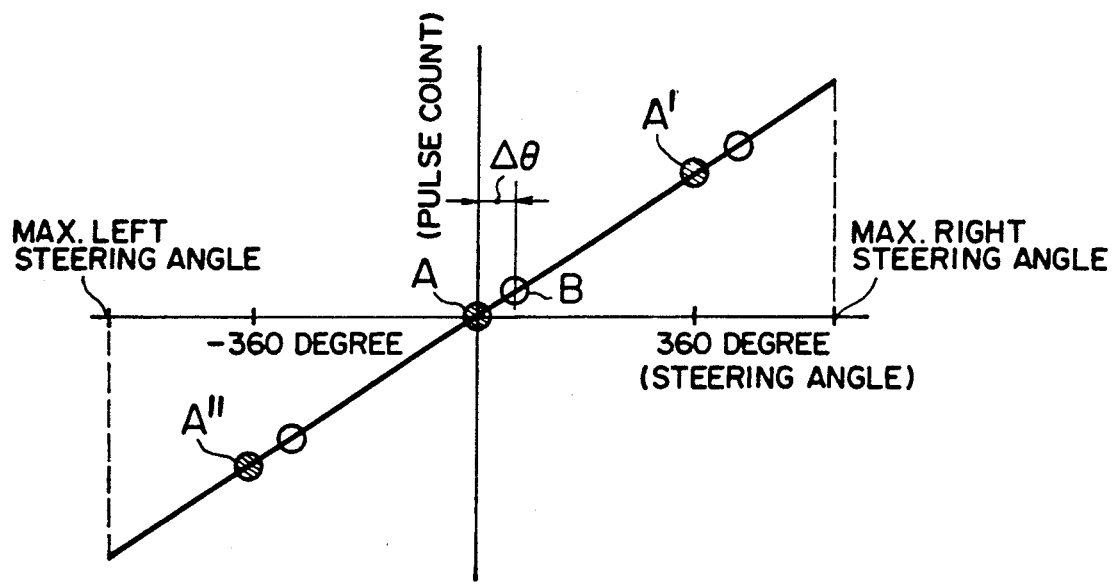
FIG. 5 is an explanatory graph for a description of detection positions of a neutral position mark when the steering wheel is fully turned to the left or right.

More specifically, a maximum number of turns or rotations of the steering shaft 6 is generally designed between two rotations and four rotations. Therefore the photointerrupter 5 detects the neutral position mark 3 during steering operation from a maximum right steering limit to a maximum left steering limit at a total of three points, namely, the true reference position A and, additionally, positions A' and A" which are angularly spaced respectively 360° left and right from the position A as indicated in FIG. 5. Therefore after supplying the power to the microcomputer by connecting the battery terminals, the microcomputer starts resetting the reference position A. Further, the microcomputer may enable to start the resetting responsive to the operation of a resetting switch. Then the three positions A', A, A" are detected by turning the steering wheel 20 in one direction from the maximum right steering limit to the maximum left steering limit. By this procedure, the median detected position among the three detected positions is recognized and set as the reference position A.

The resetting of the reference position A is accomplished in the microcomputer by selecting the median detected position from among a plurality of detected position as described above. Therefore, it is necessary for the detection only to turn the steering wheel 20 in unidirectional steering from one limit to the other limit. The recognition and setting logic of the microcomputer is also very simple. Further, the reference position A thus reset is always at the same position as the reference position A of the aforementioned initial setting time. Since the deviation $\Delta\theta$ is stored in the non-volatile memory or the memory with the backup power supply as described hereinabove, the absolute steering angle detection after the resetting of the reference position A is accurate, similarly as the detection after the initial setting of the reference position A. Thus there is no possibility whatsoever of occurrence of deviant error. The above described operational processes are indicated diagrammatically by the operational flow charts shown in FIGS. 8 and 9.

Figure 6A:
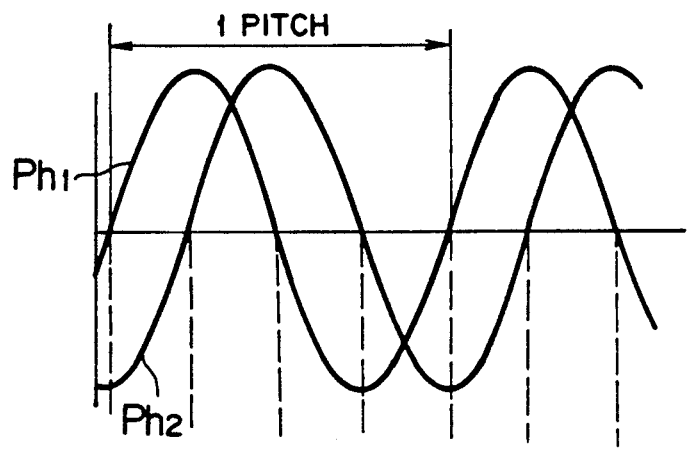
FIG. 6 is a waveform time chart indicating the generation of pulses in a photointerruptor of the steering angle sensor.
Figure 6B:
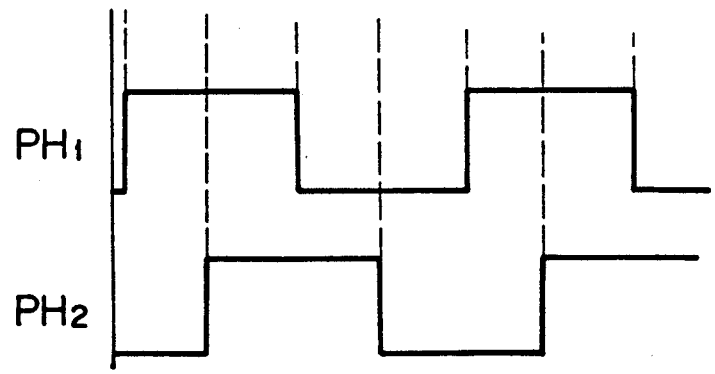

Another type of an optical rotary encoder 10 may be utilized in the present invention. Photodetectors 4b and 5b of the encoder 10 output voltages of sinusoidal waveform as shown in FIG. 6(a) in accordance with these alternating light-dark variations as the slitted disk 1 rotates through one pitch of its slits. These sinusoidal waveform voltages are further converted into rectangular pulses as indicated in FIG. 6(b) by a known waveform shaping circuit. Then, by counting the number of these pulses by means of the microcomputer, it becomes possible to compute the steering angle.

Other than the system of detecting the steering angle from the count of the number of pulses as described above, there is an alternative system for detecting the steering angle even more finely. The system comprises an A/D converter converting the output voltage of the above described sinusoidal waveform and computing the steering angle by means of a microcomputer in accordance with resulting digital value (voltage value). The system is indicated in FIG. 7.

The present invention has been described above with respect to an embodiment of application thereof to the optical rotary encoder. However, the present invention is not limited to the application as described above. The present invention is also applicable to various other types of steering angle sensors which determine the steering angle by computation from analog output signals. One example is a magnetic rotary encoder which generates a sinusoidal-wave output signal in accordance with the rotation of the steering shaft. Another example is a rotary encoder which generates a saw-tooth output signal in accordance with the rotation of the steering shaft. For example, the present invention is applicable also to a steering angle sensor having at least one reference position for one revolution of the steering shaft, for example, a reference position which is the zero point of an analog output.

According to the present invention as described above, numerous meritorious features are afforded. The most important one is as follows.

For detecting the steering angle of a vehicle, a sensor which generates a digital or analog signal in accordance with the rotation of the steering shaft, and which has at least one reference position for every revolution of the steering shaft, is used. From the output signal of the steering angle sensor, a microcomputer determines by computation the rotational angle of the steering shaft.

In the steering angle determination system described above, the reference position in the straight-ahead driving state of the vehicle or in the proximity thereof is set as a reference position A. At the same time, when the reference position A and the actual straight-ahead driving state position B of the steering shaft do not coincide, the deviation $\Delta\theta$ between these positions A and B is stored and held in a non-volatile memory or a memory with a backup power supply. Thus the initial setting is accomplished. Then the microcomputer receives the output signal from the steering angle sensor and determines the rotational angle of the steering shaft with the reference position A. At the same time the value thus determined is corrected by the deviation $\Delta\theta$ thereby to obtain the absolute steering angle.

Therefore, even in the case where the stored memory of the absolute steering angle is lost because of a temporary cut-off of the microcomputer power supply as described above, there is no problem. That is, the value of the deviation $\Delta\theta$ is still stored and held. Therefore, the true reference position A is merely determined and reset from a plurality of reference position. By this simple process, accurate detection of the absolute steering angle can be once again started.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method for detecting an absolute steering angle of a steering angle sensor mounted on a vehicle wherein said steering angle sensor generates an angle signal indicating a relative rotation angle of a steering shaft of said vehicle and a reference signal representing a reference position for every one rotation of said steering shaft, comprising:

detecting after completing the installation of said steering angle sensor on said vehicle, a deviation of angle between said reference signal and said angle signal generated at the time when said steering shaft is in an actual straight-ahead driving position, said deviation being stored in a memory of a computer, which memory retainer said deviation even though said computer is disconnected from a power supply;

determining a steering angle away from said reference position in response to said angle signal and said reference signal while the vehicle runs; and correcting said steering angle with said deviation, thereby accurately obtaining an absolute steering angle regardless of any error in installing said steering angle sensor during the assembling of the vehicle.

2. The method according to claim 1, wherein said detecting step comprises the steps of:

adjusting said steering shaft in the actual straight-ahead driving position;

inputting said angle signal output from said steering angle sensor while said steering shaft is in said actual straight-ahead driving position;

rotating said steering shaft alternatively to both rotational direction;

inputting said reference signal from said steering angle sensor while said steering shaft is rotated in said rotating step;

calculating said deviation of angle between said reference signal and said angle signal input in said inputting step; and storing said deviation in said memory.

3. The method according to claim 2, further comprising:
turning on a manual switch to generate a switch signal after said adjusting step, whereby said angle signal at the straight-ahead driving position is detected in said detecting step responsive to said switch signal.

4. The method according to claim 10, wherein said deciding step comprises:
reconnecting said computer to said battery which have been disconnected from each other;
turning said steering shaft from one rotation limit to the other rotation limit of said steering shaft;
detecting a plurality of reference signals output from said steering angle sensor during said turning step; and
determining a median occurrence reference signal among said plurality of reference signals as an actual reference signal corresponding to said straight-ahead driving position, thereby resetting said reference position.

5. The method according to claim 1, wherein said steering angle sensor is an optical rotary encoder comprising a slitted disk fixed coaxially to the steering shaft and provided with a reference position mark thereon, and a photointerruptor fixedly mounted on a steering column of the vehicle opposite to the slitted disk.

6. The method according to claim 1, wherein said steering angle sensor is a magnetic rotary encoder which generates a sinusoidal-wave output signal in accordance with the rotation of the steering shaft.

7. The method according to claim 1, wherein said steering angle sensor is a rotary encoder which generates a saw-tooth output signal in accordance with the rotation of the steering shaft.

8. The method according to claim 1, wherein said memory is a non-volatile memory.

9. The method according to claim 1, wherein said memory is a memory with a backup power supply.

10. The method according to claim 1, further comprises the step of:
deciding the reference position after the computer is reconnected to the battery by selecting a median reference signal from a plurality of reference signals detected by the steering angle sensor while steering from one limit to the other limit.

11. A method for detecting an absolute steering angle of a steering angle sensor mounted on a vehicle wherein said steering angle sensor transmits to a computer an angle signal indicating a relative rotation angle of a steering shaft of said vehicle and a reference signal representing a reference position for every one rotation of said steering shaft and said computer includes a memory retaining a deviation angle of said reference position from an actual straight-ahead driving position of said steering shaft even though said computer is disconnected from a battery, comprising:
reconnecting said computer to said battery which have been disconnected from each other once;
turning said steering shaft from one rotation limit to the other rotation limit of said steering shaft;
detecting a plurality of reference signals output from said steering angle sensor during said turning step;
determining a median occurrence reference signal among said plurality of reference signals as an actual reference signal corresponding to said straight-ahead driving position, thereby identifying said reference position after said reference position is erased from said memory due to disconnecting said battery from said computer;
determining a steering angle away from identified reference position in response to said angle signal and said reference signal representing said identified reference position while the vehicle runs; and
correcting said steering angle with said deviation, thereby accurately obtaining an obsolute steering angle regardless of any error in installation of said steering angle sensor in assembling the vehicle.

* * * * *